United States Patent [19]

Reinecke

[11] 4,116,307
[45] Sep. 26, 1978

[54] FLUID PRESSURE OPERATED DISC BRAKE HAVING SERVICE, AUXILIARY AND PARKING BRAKE SYSTEMS

[75] Inventor: Erich Reinecke, Beinhorn, Fed. Rep. of Germany

[73] Assignee: WABCO Westinghouse GmbH, Hanover, Fed. Rep. of Germany

[21] Appl. No.: 839,543

[22] Filed: Oct. 5, 1977

[30] Foreign Application Priority Data

Oct. 16, 1976 [DE] Fed. Rep. of Germany ....... 2646870

[51] Int. Cl.² .................... F16D 55/10; F16D 65/24
[52] U.S. Cl. ........................... 188/106 P; 188/72.4; 188/265
[58] Field of Search ............... 188/71.3, 72.3, 72.5, 188/106 P, 265, 364; 303/89, 2, 9

[56] References Cited

U.S. PATENT DOCUMENTS

| 3,680,666 | 8/1972 | Sommer | 188/72.3 X |
| 3,997,031 | 12/1976 | Klave | 188/71 X |
| 4,024,931 | 5/1977 | Klave | 188/18 A |

*Primary Examiner*—Duane A. Reger
*Attorney, Agent, or Firm*—R. W. McIntire, Jr.

[57] ABSTRACT

A fluid pressure operated disc brake having one brake disc affixed to the housing of a brake cylinder unit and the other disc affixed to a service brake piston of the brake cylinder unit, which further includes an auxiliary brake piston between the service brake piston and cylinder head, thereby forming on opposite sides thereof a service brake actuating chamber and an auxiliary brake actuating chamber to which fluid pressure may be admitted via separate service and parking brake valve devices. A filling piece disposed between the brake cylinder housing and auxiliary piston is operatively connected with an actuating cylinder to which the parking brake valve also supplies auxiliary brake pressure to operate the filling piece following an auxiliary brake application, thereby mechanically locking-up the brake discs in the brake application condition to provide a parking brake. In the several embodiments of the invention, the filling piece takes the form of a ring member having an inclined surface that interacts with an inclined surface of the auxiliary piston upon actuation of the ring member, a cam acting against the auxiliary piston, and a ball or roller acting between inclined facing surfaces of the brake cylinder housing and auxiliary piston. Means associated with the filling piece and/or actuating cylinder permit unlimited adjustment of the filling piece in a direction to lock-up the brake discs in brake application position, but only allow limited retraction of the filling piece adjustment when releasing the parking brake to maintain a predetermined brake piston clearance irrespective of brake shoe wear.

16 Claims, 8 Drawing Figures

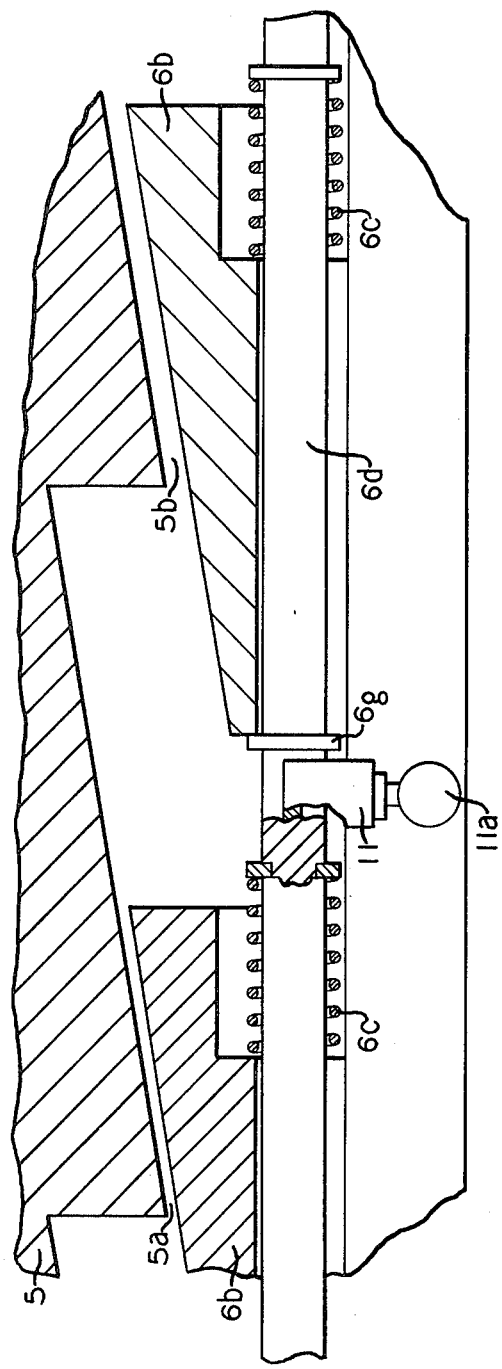
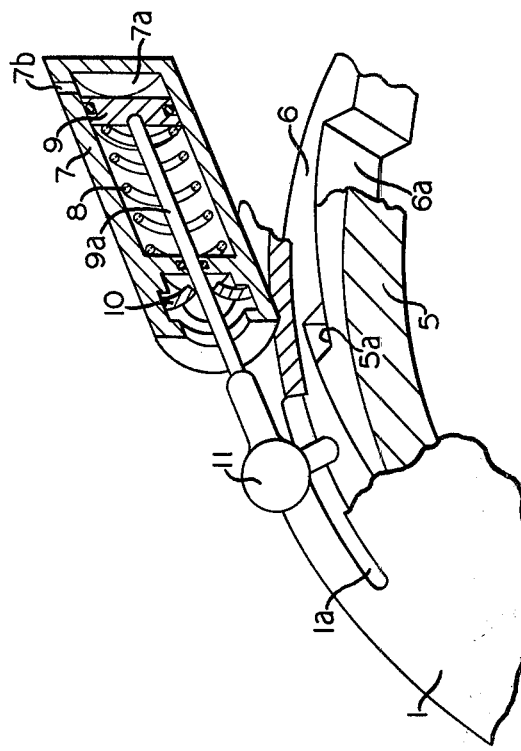
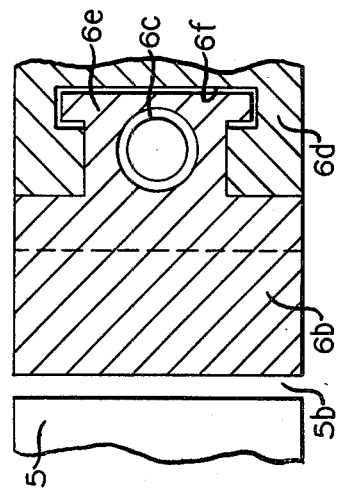

FLUID PRESSURE OPERATED DISC BRAKE HAVING SERVICE, AUXILIARY AND PARKING BRAKE SYSTEMS

BACKGROUND OF THE INVENTION

The present invention relates to fluid pressure operated disc brakes for commercial sized automotive vehicles, which incorporate independently operable auxiliary and service brake systems, as well as a parking brake.

Disc brakes, which are today commonly employed in the passenger vehicle field, are finding increasing popularity among commercial sized vehicles, particularly those in the light and medium weight range where purely hydraulic brake systems are employed.

When employing disc brakes on commercial vehicles in the heavy weight range, it is common practice to combine with both the service and parking brake systems an auxiliary brake system capable of producing incremental changes in the braking action.

Typically, such heavy duty disc brakes are pneumatically operted, utilizing a spring-loaded cylinder in combination with the auxiliary diaphragm cylinders mounted outside the conventional wheel brake. Such a cylinder arrangement has come to be known as a "tristop" brake cylinder. While operatively satisfying the braking requirements, such an arrangement requires considerable space, so that only the rear wheels are normally so arranged. Consequently, inadequate parking brake forces are obtained when a loaded vehicle is parked on a grade, for example, while furthermore, the advantages of the auxiliary brake function are only realized at the rear wheels. Moreover, these "tristop" cylinder arrangements are considerably expensive, thus negating their use on all the wheels, even where space conditions otherwise permit such installation.

Another known disc brake arrangement combines the service brake with a spring-loaded parking brake, which is also employed to provide the auxiliary brake. Such an arrangement, however, has the disadvantage of being unreliable, since over the coarse of time the spring becomes fatigued and may ultimately break. Moreover, a further disadvantage of this spring-loaded brake resides in the fact that springs have relatively large tolerances and, as a result, often produce a considerable difference in the various wheel brake forces.

SUMMARY OF THE INVENTION

The object of the present invention therefore is to overcome the above discussed disadvantages in providing a disc brake having the ability to provide service, auxiliary and parking brake action by providing a simple mechanical locking or arresting device capable of locking-up the auxiliary brake to obtain the parking brake function.

A further object of the invention is that of providing a mechanical locking or arresting device to lock-up the auxiliary brake for parking brake operation, which can be arranged to concurrently adjust the brake piston clearance for the service brake to compensate for brake lining wear.

These objectives are attained according to the present invention through the use of a filling piece between the disc unit brake cylinder to which at least one brake shoe is connected and an auxiliary piston operable in the brake cylinder responsive to the supply of pressure via a parking brake valve device, which is separate from the service brake system pressure supply. In the several emobidments of the invention shown, various forms of the filling piece are proposed, all of which result in the filling piece being actuated to take-up the space between the brake cylinder and auxiliary piston following operation of the auxiliary brake to thereby lock-up the effective brake application. The degree of actuation of the filling piece is, of course, unlimited in order to take-up whatever space exists between the brake cylinder and auxiliary piston, as this space varies with the amount of accumulated brake shoe wear. On the other hand, the degree of retraction of the filling piece when releasing the parking brake is limited to an amount corresponding to the desired brake piston clearance through either a cramp ring arrangement associated with the filling piece actuator mechanism or a pawl and ratchet arrangement. Accordingly, the filling piece serves the additional function of a slack adjuster, by compensating for brake shoe wear each time the parking brake is used.

In eliminating the need for a power spring to apply the auxiliary and parking brakes, greater parking brake forces can be obtained, while assuring the braking effect, as required for auxiliary braking in the event of a failure of the service brake system. Moreover, the absence of a spring substantially increases the reliability of both the auxiliary and parking brake systems.

An improved utilization of space has been obtained, so that all the wheels can be equipped to provide both auxiliary and parking brakes, thus affording, in addition to the improved auxiliary brake effect gained by utilizing all the wheels, a parking brake which is effective in holding the heaviest vehicles on a grade.

In addition, the differences in brake forces between the different wheels is minimal.

BRIEF DESCRIPTION OF THE DRAWINGS

The invention will now be further explained with reference to the accompanying drawings in which:

FIG. 1a is another embodiment showing a partial view of a multi-part filling piece carried on a support having a circular cross section;

FIG. 1b is a cross-sectional view of an alternate support for the multi-part filling piece of FIG. 1a having a rectangular cross-section;

FIG. 1c is a perspective view partly in section showing an actuator arranged with the filling piece in the preceding Figures, which may also be used with the arrangements shown in the embodiments of the following Figures, and a filling piece retraction device;

Other objects and advantages of the invention will become apparent from the following more detailed explanation.

DESCRIPTION AND OPERATION

Figure 1:
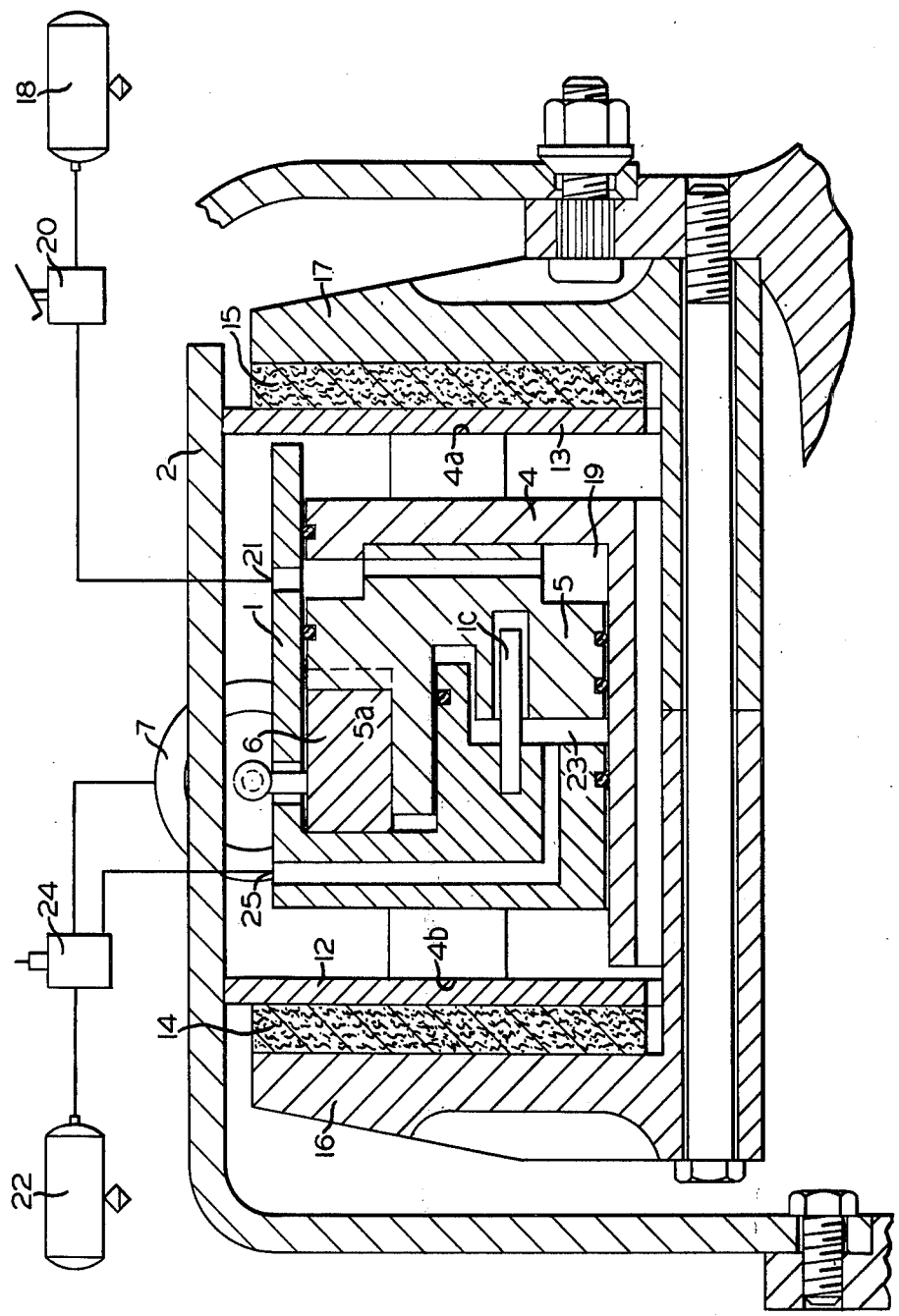
FIG. 1 is a partial assembly view showing a first embodiment of a disc brake unit showing one form of filling piece.

FIG. 1 shows an annular brake cylinder housing 1 which is used for a full disc brake and which is connected via a housing support 2 with an axle spindle in such a manner that it can perform only an axial movement. A service brake piston 4, an auxiliary brake piston 5 and a filling piece 6 forming part of a locking device for the parking brake piston 5 are located in the housing 1.

The auxiliary brake piston 5 is provided with a kind of toothing formed with inclined faces which rise in the axial direction (see also FIG. 1c). This toothing 5a forms an operative connection with the filling piece 6, by means of a matching, inclined face 6a, which is rotatably supported about the wheel axle in a manner similar to two expanding keys which are movable relative to each other. Rotation of the filling piece 6 is produced by an actuating cylinder 7 containing a piston 9 subject to a spring 8 and whose stroke is controlled by a cramp ring type of locking mechanism 10, which engages with and grips the piston rod 9a. This locking mechanism 10 serves to adjust the clearance of the service brake piston when brake lining wear occurs.

The movement of the piston rod 9a transmitted to the filling piece 6 via a pivot connection 11 which, through an opening 1a in the housing 1, is connected with said filling piece 6.

The locking mechanism 10 allows the piston 9 an unlimited stroke in the direction of the filling-piece closing movement but allows only a limited return stroke.

The brake bands 12, 13, which in the peripheral direction are fixedly supported in the housing support 2 but which are freely movable in the axial direction, are fixedly attached to the brake linings 14, 15. When the brake is actuated, the linings 14, 15 form a frictional connection with the rotating brake discs 16, 17, on the one hand, via the piston 4 by way of its contact area 4a and, on the other hand, by way of the contact area 1b of the housing 1.

The parking brake piston 5 is protected against rotation by means of a pin 1c in the brake cylinder housing 1.

Pneumatic connections are provided between an air tank 18 and a service brake chamber 19, located between the two pistons 4, 5, via a brake valve 20 and a connection 21 of the cylinder housing 1, and between a second air tank 22 and a parking brake chamber 23, located on the other side of the piston 5, via a parking brake valve 24 and a connection 25 of the cylinder housing 1. The chamber 7a in the actuating cylinder 7 is also connected with the hand brake valve 24 by way of a connection 7b.

The operation of the disc brake combination shown in FIG. 1 is as follows:

When the service brake is to be applied, pressure is admitted into the service brake system by actuating the brake valve 20, such that control pressure fills the chamber 19 located between the service brake piston 4 and the parking or auxiliary brake piston 5.

While the service brake piston 4 carries out the actuating movement and transmits it to the brake linings 15, the auxiliary brake piston 5 pushes against the filling piece 6, which transmits braking force to brake linings 15 via cylinder housing 1. The clearance of the service brake piston 4 results from the distance between the two pistons 4 and 5 and is actually predetermined by the adjustment of the filling piece 6, as hereinafter explained.

When the parking brake is to be applied, compressed air is admitted into the auxiliary or parking brake system by actuating the hand brake valve 24, such that control pressure fills the chamber 23, and the auxiliary brake piston 5 produces the actuating movement while taking along the service brake piston 4 which, as in the case of a service brake activation, transmits the movement to the brake linings 14, 15. During both service and auxiliary brake action, parking brake valve 24 maintains actuating cylinder 7 pressurized to withhold engagement of filling piece 6.

When, after stopping the vehicle, the auxiliary brake is to be secured or locked for parking purposes, the brake valve 24 is operated to a control position in which the pressure normally supplied from the hand brake valve 24 to the chamber 7a in the actuating cylinder 7 to keep the locking piston 9 in the unlocked position against the force of the spring 8, is now released so that the force of the spring 8 moves the piston 9 into the locked position. The pivotable connection 11, which is connected with the piston rod 9a and follows the movement, transmits this movement to the annular filling piece 6 which presses with its stepped, inclined faces 6a against the stepped, inclined faces 5a of the auxiliary brake piston 5. When the auxiliary brake pressure effective on chamber 23 subsequently drops, the braking effect is preserved on account of this positive connection, i.e. the parking brake application is preserved automatically, even after the auxiliary brake pressure leaks away.

In order to release the parking brake, air is supplied to the auxiliary brake chamber 23 and chamber 7a by switching the hand brake valve 24 to the appropriate control position so that, after an adequate pressure has been built up in chamber 23, forces are removed from the filling piece 6 and the air subsequently admitted into the operating cylinder 7 and its chamber 7a is effective to rotate filling piece 6 and thereby eliminate the locked condition. The locking mechanism 10 located in the frontal area of the operating cylinder 7 permits the locking piston stroke, which is necessary to lock or arrest the parking brake, to be unrestricted but, when releasing the parking brake, limits the return stroke to a distance which corresponds to the maximum free stroke of the service brake piston 4. In this manner, the distance between the auxiliary brake piston 5 and the service brake piston 4 is kept approximately constant, even when lining wear occurs, by adjusting the auxiliary brake piston 5. Thus, this clearance is compensated for each time when the locking device of the parking brake is disengaged.

The pin 1c, which is mentioned in the description of the structural design of the disc brake and which protects the auxiliary brake piston 5 against rotation, is dispensable in the case where the inherently rotation-free housing 1 is provided with inclined faces and the adjusting ring 6 lies with its plane surface against the piston, as an alternative arrangement.

The arrangement of FIG. 1 can also be used in a similar manner for a partial disc brake, in which case the annular filling pieces provided with the wedge-shaped elements are replaced by individual wedges, while the annular pistons are replaced by circular pistons.

According to further refinements, the single filling piece may be replaced by several parts 6b disposed in series (see FIGS. 1a, 1b). In this case, wedge-shaped parts 6b are mounted in a resilient manner, e.g. by means of springs 6c, on a support 6d. As a result, in the case of different stroke lengths of the brake piston 5 due to uneven lining wear of a disc with respect to the filling piece 6b the contact pressure of the brake linings is adapted, in such a manner that after applying a first filling-piece or wedge-shaped part, a further variable actuating movement corresponding to the stroke length can take place to produce further compensation, in which case the different stroke lengths are apparent from the different widths of clearances, for example 5a and 5b, between the auxiliary brake piston 5 and the parts 6b forming the filling piece.

The support 6d is an annular part which is guided in an annular slit and which, in the embodiment according to FIG. 1a, has a circular cross section and, in the embodiment according to FIG. 1b, has an essentially rectangular cross section, in which case the wedge-shaped parts 6b are provided with fins 6e which are guided in matching grooves 6f of the support 6d, the fins and grooves having a T-shaped cross section in the example as shown.

The displacement of the support 6d is brought about by actuating the ball end 11a which forms part of the pivotable connection 11, and which is displaced by the actuating cylinder 7 (shown in FIG. 1c).

The support 6d is further provided with stops 6g which in the form, as shown, are for instance ring-shaped, and serve to unlock the parts 6b when releasing the parking brake.

Figure 2:
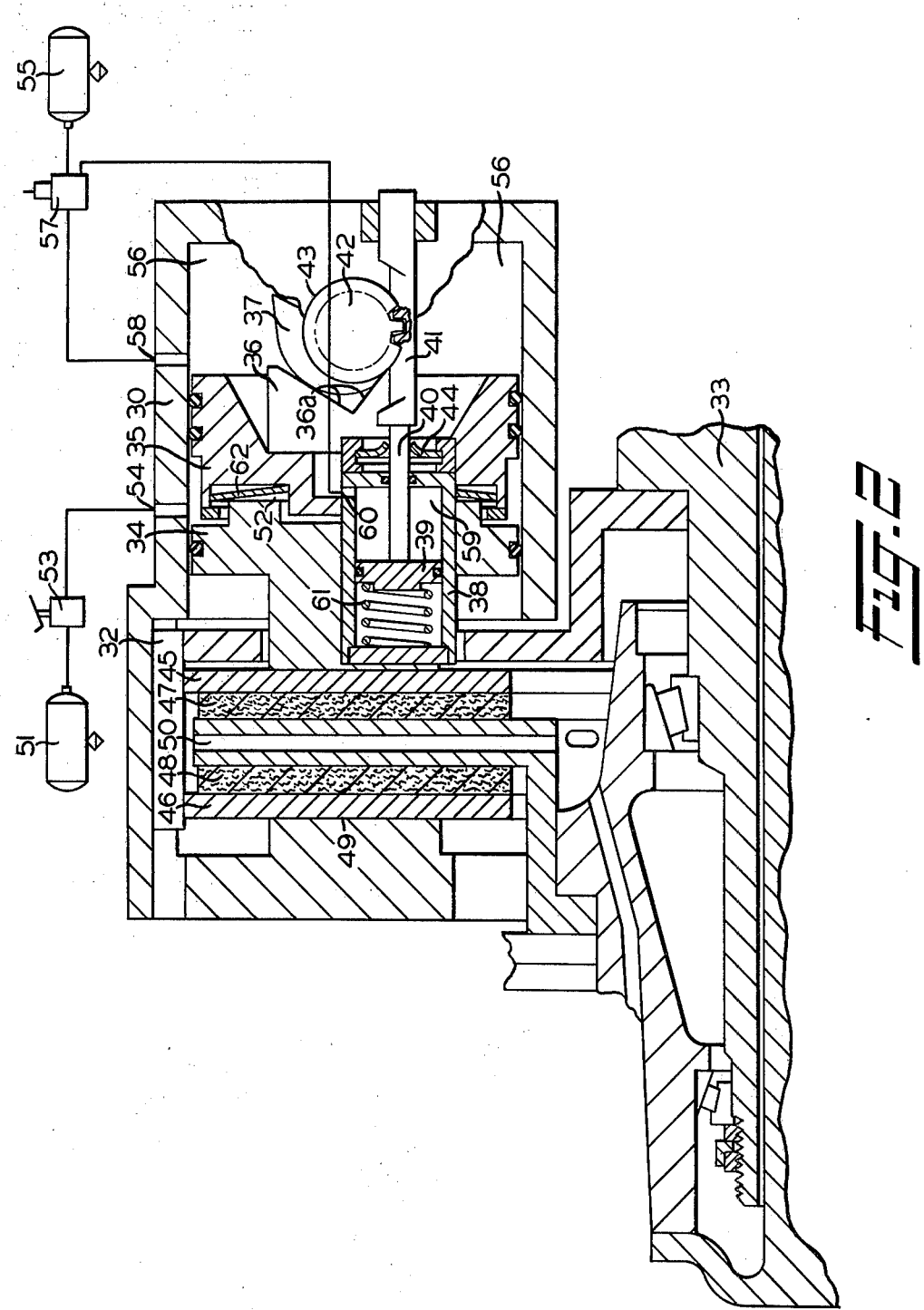
FIGS. 2–4 are further embodiments of the invention showing various alternate forms of a filling piece.

FIG. 2 shows a cylinder housing 30 of a partial disc brake which is connected, via a housing support 32, with an axle tube 33 in such a manner that it can move in an axial direction only.

A service brake piston 34, an auxiliary brake piston 35 and a locking part 36 forming part of a locking or arresting device, which is provided for the auxiliary brake piston 35 and which provides a filling piece in the form of a cam 37, are located within the housing 30.

The locking device consists of an operating cylinder 38 which is disposed across the line of separation of the pistons 34 and 35 and whose piston 39 is connected with the cam 37 by way of its piston rod 40, a toothed rod 41 joined to the piston rod 40 and a pinion gear 43 on a spindle 42 which is rotatably supported in the housing 30.

The frontal area of the operating cylinder 38 contains a locking mechanism 44 in the form of a cramp ring surrounding rod 41, which makes possible the stroke of the toothed rod 41 in the direction of the actuating movement of the filling piece or cam, but allows only to a limited extent a return stroke. This locking mechanism 44 serves to adjust the clearance of the service brake piston when brake lining wear occurs.

The brake bands 45 and 46, which in the peripheral direction are fixedly supported in the housing support 32 but which are freely movable in the axial direction, are fixedly attached to the brake linings 47, 48. The linings 47, 48 form a frictional connection with the brake disk 50 via the service piston 34 and contact areas 49 of the housing 30.

Pneumatic connections are provided between an air tank 51 and a service brake chamber 52, located between the two pistons 34 and 35, via a brake valve 53 and a connection 54 of the cylinder housing 30, and between a second air tank 55 and a parking brake chamber 56, located on the other side of the piston 35, via a parking brake valve 57 and a connection 58 of the cylinder housing 30. A chamber 59 in the operating cylinder 38 is also connected with the parking brake valve 57 by way of a cylinder connection 60.

The operation of the disc brake combination shown in FIG. 2 is as follows:

When pressure is admitted into the service brake system by actuating the service brake valve 53, the control pressure fills the chamber 52 located between the service brake piston 34 and the auxiliary brake piston 35.

While the service brake piston 34 carries out the actuating movement and transmits it to the brake linings 47, 48, the auxiliary brake piston 35 pushes against the arresting member 36. The clearance of the service brake piston 34 results from the distance between the two pistons 34 and 35 and is actually predetermined by the adjustment of the arresting member 36.

When compressed air is admitted into the auxiliary or parking brake system by actuating the parking brake valve 57, the control pressure fills the chamber 56, and the auxiliary brake piston 35 produces the actuating movement while taking along the service brake piston 34 which, as in the case of a service brake activation, transmits the movement to the brake linings 47, 48.

When, after stopping the vehicle, the brake is to be secured or locked, the parting brake valve 57 is brought into the appropriate control position and the pressure which in the unlocked position of the parking brake is steadily supplied from the parking brake valve 57 to the chamber 59 of the operating cylinder 38 and which keeps the cylinder 39 in the unlocked position against the force of a spring 61, is reduced so that the force of the spring 61 urges the piston 39 into the locked position. The toothed rod 41, which is connected to the piston rod 40 and follows the movement, transmits this movement to the pinion gear 43 and pushes the filling piece or cam 37 against the inclined face 36a or two inclined faces of the arresting member 36. When the auxiliary brake pressure drops, the braking effect is preserved on account of this positive connection, i.e. the parking brake application is preserved automatically.

To release the parking brake, air is supplied to the auxiliary brake chamber 56 by switching the parking brake valve 57 to the appropriate control position, so that, after an adequate pressure has been built up in said chamber 56, forces are removed from the arresting member 36 and the air subsequently admitted into the operating cylinder 38 or its chamber 59, eliminates the locked condition. The locking mechanism 44 located in the frontal area of the operating cylinder 38 causes the stroke, which is necessary to lock or arrest the parking brake, to be free, but, when releasing, allows the return stroke only a limited path which corresponds to the maximum free stroke of the service brake piston 34. In this manner, the distance between the auxiliary brake piston 35 and service brake piston 34 is kept approximately constant, even when lining wear occurs, by adjusting the auxiliary brake piston 34. Thus, this clearance is compensated for each time when releasing the locking device of the parking brake.

A disc type spring 62 disposed between the service brake piston 34 and the auxiliary brake piston 35, being a resilient member, is to reduce — in the transmission of force through the locking mechanisms 36, 37 — forces resulting from changes in length due to fluctuations in temperature and possible setting strokes.

Figure 3:
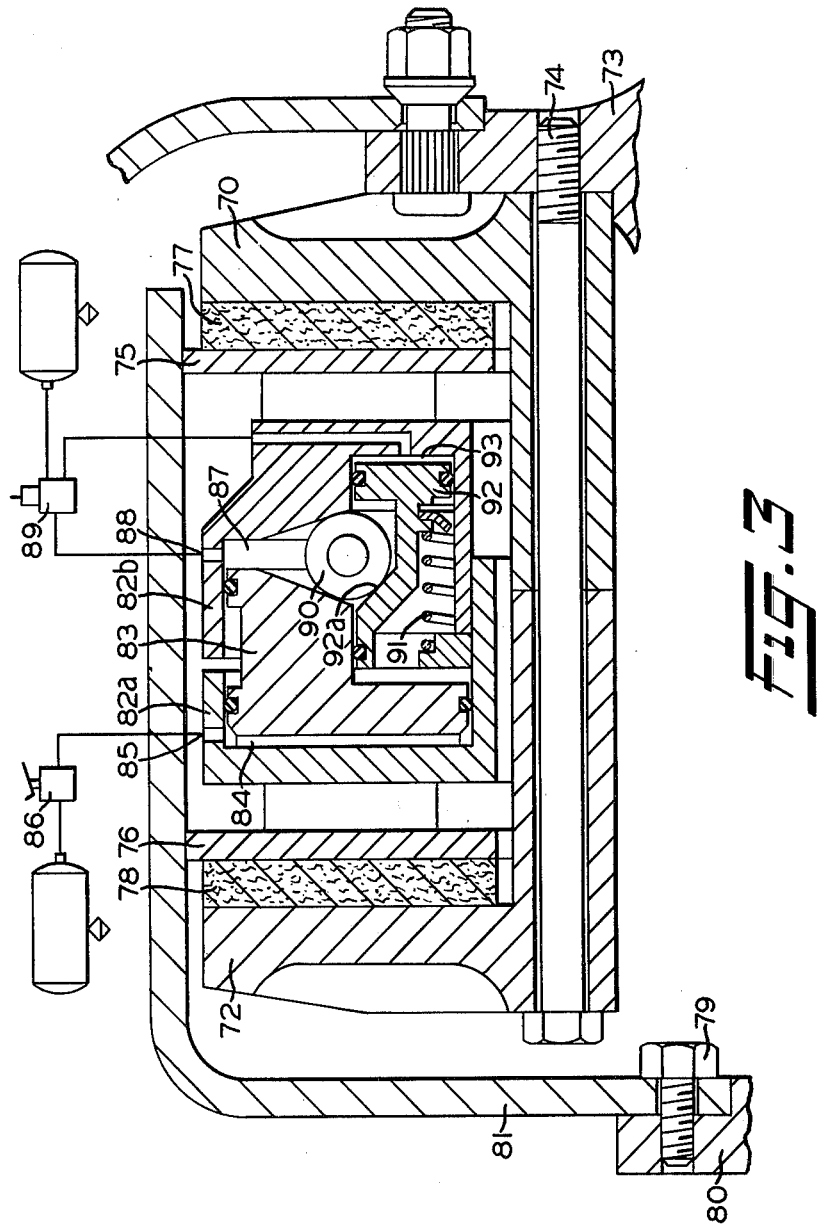

FIG. 3 shows a full disc brake whose rotating brake discs 70 and 72 are attached to a wheel hub 73 by means of a bolt 74. The fixed parts of the brake consist of the brake bands 75 and 76 with the brake linings 77 and 78, which when braking form a frictional contact with the rotating brake discs 70 and 72 and which, being fixed in the peripheral direction and freely movable in the axial direction, are suspended at the brake support 81, which is attached to the axle flange 80 by means of bolts 79.

The actuating device of the brake consists of a two-part annular cylinder 82a, 82b disposed between the brake bands 75 and 76, and, axially movable therein, an annular auxiliary brake piston 83 sealed off by sealing rings.

A service brake chamber 84 disposed between the annular cylinder 82a and the annular piston 83 is connected, via the connection 85, with the service brake valve 86, and an auxiliary brake chamber 87 enclosed by the annular cylinder 82b and the annular piston 83 is connected, via the connection 88, with the parking brake valve 89.

Between the outwardly extending faces of the piston 83 and the cylinder 82b which define the auxiliary brake chamber 87, there is located a filling piece in the form of a roller or ball 90 which rests on an inclined surface of an auxiliary piston 92 disposed thereunder and kept under the tension of a spring 91. A chamber 93 disposed above the piston 92 is connected with the parking brake valve 89.

When actuating the service brake valve 86, air is supplied to the service brake chamber 84 through the connection 85. The pressure being built up therein urges, on the one side, the brake cylinder 82a with the brake band 76 and brake lining 88 against the rotating brake disc 72 while, on the other side, the pressure acting in the opposite direction upon the annular piston 83 brings about a movement of the piston 83 which is transmitted, via the roller 90, to the annular cylinder 82b, so that its brake lining attached to the brake band 75 is pressed against the rotating brake disc 70.

When actuating the parking brake valve 89, air is supplied to the auxiliary brake chamber 87 through the connection 88. The pressure being built up therein urges, on the one side, the annular piston 83 against the inner face of the annular cylinder 82a, so that the latter brings about a brake activation as described for the service brake activation, while on the other side the annular cylinder 82b moves with its brake band 75 and brake lining 77 directly against the other brake disc 70. The filling piece or roller 90 then rests loosely, or under the influence of a pushing or pulling force of a spring (not shown), on an inclined surface 92a of the auxiliary brake piston 92, since the pressure admitted into the chamber 93 via the parking brake valve 89 retains — against the tension of the spring 91 — the piston 92 in a position which is not controlled by the roller 90. Only when terminating a parking brake actuation is the pressure in the chamber 93 reduced to lock the parking brake, so that the force of the spring 91 causes the piston 92 to move in the direction of tension and, due to the inclined face 92a of the piston 92, the roller 90 moves upwards against the wedge-shaped faces which are formed by those areas of the annular piston 83 and annular cylinder 82b which face the chamber 87.

Thus, the auxiliary brake is locked in its applied position to provide a parking brake.

In order to release the parking brake, air is supplied to the chamber 87 by switching the parking brake valve to the appropriate control position, so that forces are removed from the filling piece or roller 90 and the air subsequently supplied to the chamber 93 eliminates the locked condition.

Figure 4:
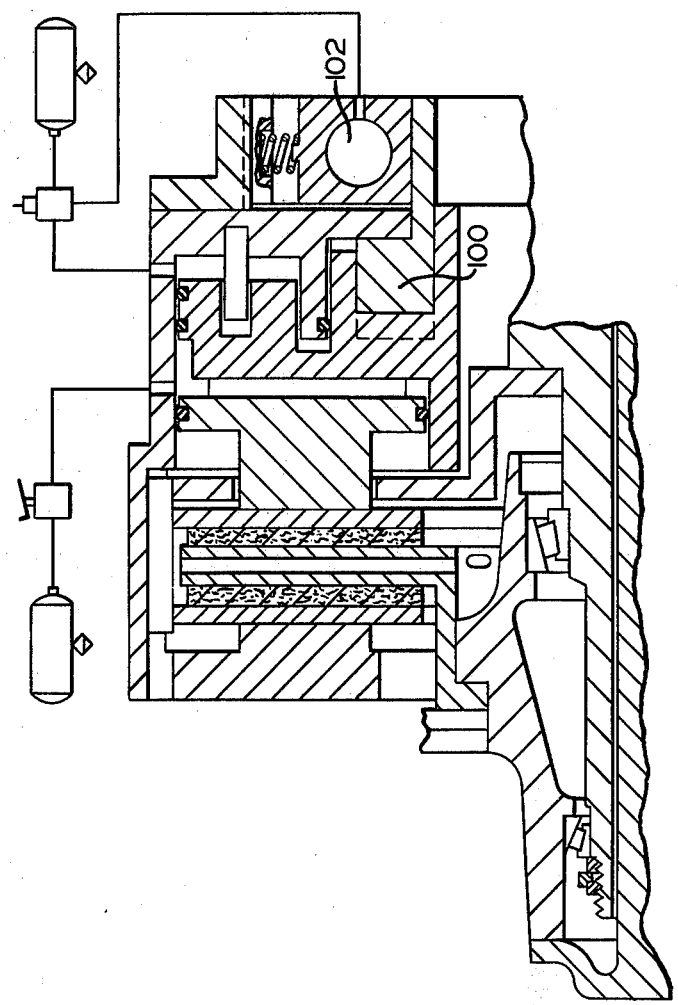

The embodiment according to FIG. 4 will be only briefly described, since its structural design and function are apparent from the drawings when taking into account the detailed description and explanations given with reference to the preceding FIGS. 1 to 3.

Figure 4A:
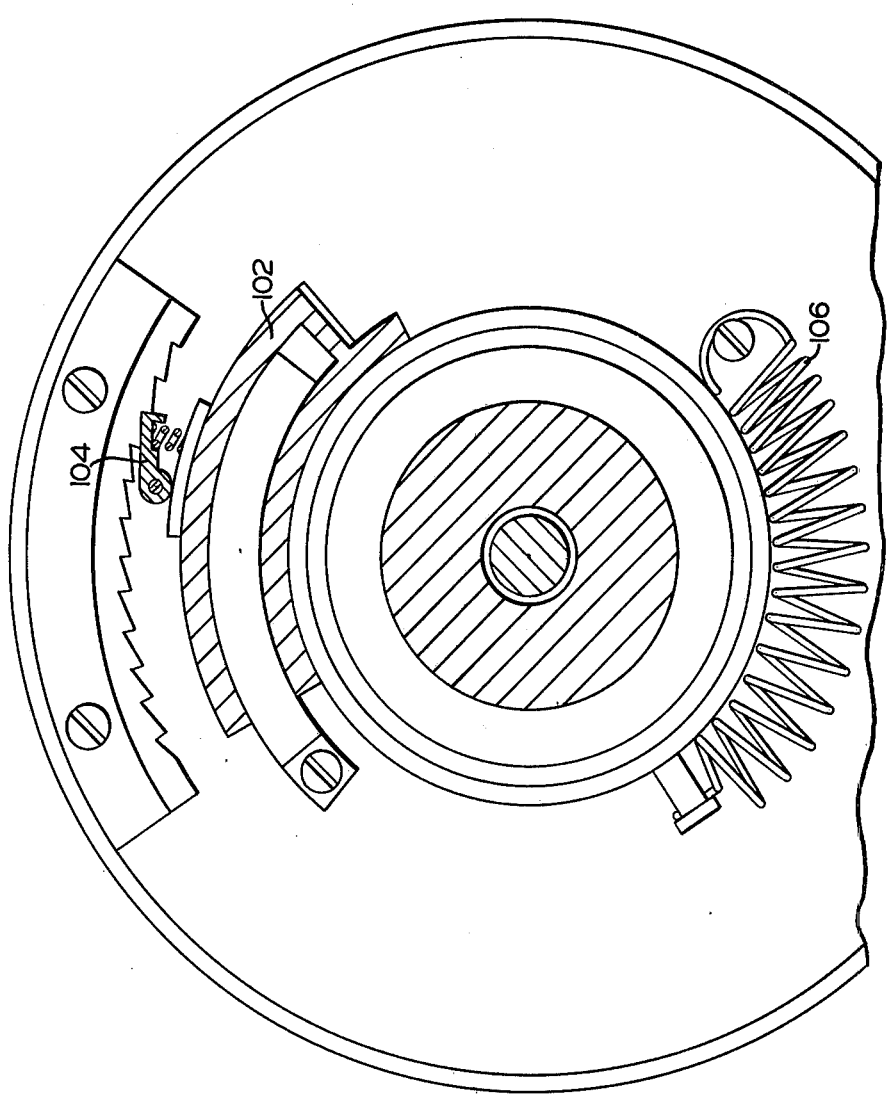
FIG. 4a is a section view of FIG. 4 showing an alternate retraction device for the filling piece.

The brake according to FIG. 4 concerns a full disc brake with a single-sided brake actuating device whose design corresponds to that of the disc brake of FIG. 1, but differs in that the movement of the filling piece 100 provided with stepped, inclined faces takes place via a curved operating cylinder 102, particular reference being had in this respect to FIG. 4a. In addition, the adjustment of the brake, i.e. the compensation for the clearance, takes place by way of a tooth-engaging pawl 104 (see FIG. 4a). The parking brake activation takes place also by removing air pressure from the operating cylinder, which in this case is curved, as a result of which the spiral spring 106 pulls the conical ring-shaped filling piece and the operating cylinder housing attached thereto in the stroke-blocking direction.

Having now describe the invention, what I claim as new and desire to secure by Letters Patent, is:

1. A fluid pressure operative disc brake unit having at least one brake shoe adapted to be actuated into frictional engagement with a rotor member of said brake unit in response to operation of either a service brake valve device to which a service supply reservoir is connected or a parking brake valve device to which an auxiliary supply reservoir is connected, said disc brake unit comprising:
    (a) a brake cylinder device;
    (b) piston means for effecting actuation of said at least one brake shoe into engagement with said rotor member comprising:
        (i) a service piston engageable with said at least one brake shoe and operative in said brake cylinder device responsive to the supply of said service reservoir pressure to a first actuating chamber thereof via said service brake valve device for movement to a brake application position; and
        (ii) an auxiliary piston cooperatively arranged in said brake cylinder device between said service piston and said brake cylinder such as to form said first actuating chamber at the one face thereof and to further form a second actuating chamber at the opposite face thereof to which the connection of auxiliary supply reservoir pressure via said parking brake valve device urges said auxiliary piston into engagement with said service piston to move the latter into said brake application position; and
    (c) locking means including an adjustable filling piece interposed between said brake cylinder and said auxiliary piston for maintaining said service piston in said brake application position following the release of fluid pressure from said second actuating chamber.

2. A disc brake as recited in claim 1, wherein said locking means further comprises actuator means for effecting adjustment of said filling piece.

3. A disc brake as recited in claim 2, further characterized in that said actuator means includes a fluid motor operative responsive to the supply of said auxiliary supply reservoir pressure via said parking brake valve device to withhold said adjustment of said filling piece.

4. A disc brake as recited in claim 3, wherein said locking means further includes resilient means for effecting said adjustment of said filling piece when said fluid motor is depressurized.

5. A disc brake as recited in claim 4, wherein said resilient means comprises a spring.

6. A disc brake as recited in claim 4 wherein said fluid motor comprises:
(a) an actuator cylinder;
(b) an actuator piston operable in said actuator cylinder responsive to the supply of said auxiliary supply reservoir pressure to said fluid motor;
(c) said resilient means being a spring arranged to bias said actuator piston in opposition to fluid pressure acting thereon, said actuator piston being connected to said filling piece to effect adjustment thereof; and
(d) means for limiting the release of said adjustment of said filling piece in response to pressurization of said fluid motor, while permitting unlimited adjustment under the influence of said spring when said fluid motor is depressurized.

7. A disc brake as recited in claim 6, further characterized in that said fluid motor comprises:
(a) an actuator rod between said actuator piston and said filling piece; and
(b) said limit means consisting of a cramp ring secured by said actuator cylinder in surrounding relationship with said actuator rod so as to grip said actuator rod upon movement thereof in response to pressurization of said fluid motor to limit movement of said actuator piston and thereby limit release of said adjustment of said filling piece.

8. A disc brake as recited in claim 4, wherein said filling piece is ring-shaped, being disposed in an annular cavity formed between said brake cylinder device and said auxiliary piston and having an inclined frontal surface contiguous with the adjacent surface of said auxiliary piston, said adjacent surface of said auxiliary piston being also inclined, said actuator means effecting rotation of said filling piece such that the unlimited adjustment thereof occurs in a direction and an amount corresponding to the axial displacement of said auxiliary piston relative to said brake cylinder device.

9. A disc brake as recited in claim 8, further characterized in that said filling piece comprises a plurality of individual wedge-shaped members resiliently disposed in a peripheral direction on an annular support in spaced-apart relationship to each other, each wedge-shaped member having its inclined surface contiguous with a separate inclined surface of said auxiliary piston.

10. A disc brake as recited in claim 7, further characterized by:
(a) said filling piece being a cam mounted for rotation on a shaft carried by said brake cylinder device; and
(b) said auxiliary piston is provided with a bearing surface against which said cam is rotatably urged by said spring to effect said unlimited adjustment of said filling piece in a direction and an amount corresponding to the axial displacement of said auxiliary piston relative to said brake cylinder device.

11. A disc brake as recited in claim 10, wherein:
(a) said cam includes a pinion gear;
(b) said actuator rod is toothed for engagement with said pinion gear to effect rotation of said cam; and
(c) said actuator cylinder is carried by said service piston.

12. A disc brake as recited in claim 10, further characterized in that said bearing surface of said auxiliary piston is inclined to the axis of said brake cylinder device.

13. A disc brake as recited in claim 6, further characterized by:
(a) said brake cylinder device having a bearing surface inclined to the axis thereof;
(b) said auxiliary piston having a bearing surface inclined to the axis of said brake cylinder device in facing relationship with the bearing surface thereof;
(c) said actuator cylinder being formed in said brake cylinder device coaxial therewith;
(e) said actuator piston having formed on its periphery an annular groove with one side inclined to the axis of said brake cylinder device; and
(d) said filling piece being at least one roller member disposed within said groove so as to project into the space between said brake cylinder device and said auxiliary reservoir defined by the respective inclined bearing surfaces thereof, said inclined side of said groove urging said at least one roller member radially outwardly in response to movement of said actuator piston by said spring to effect said adjustment of said filling piece in a first direction and an amount corresponding to the axial displacement of said auxiliary piston relative to said brake cylinder device.

14. A disc brake as recited in claim 13, further characterized in that:
(a) said brake cylinder device is provided with a coaxial rod extending into said actuator cylinder;
(b) said limit means comprises a cramp ring secured by said actuator piston in surrounding relationship with said coaxial rod so as to grip said coaxial rod upon movement of said actuator piston in a direction opposite said first direction to limit return movement thereof and accordingly limit the release of said adjustment of said filling piece.

15. A disc brake as recited in claim 4, further characterized in that:
(a) said fluid motor comprises:
(i) a curvilinear actuating cylinder mounted on an extension of said filling piece; and
(ii) an actuator piston cooperating with said actuating cylinder and having one end secured to said brake cylinder device and the other end subject to said auxiliary supply reservoir pressure; and
(b) said resilient means being a spring connected at one end with said brake cylinder device and at the other end to the extension of said filling piece to urge rotation thereof in a direction opposite rotation thereof in response to the supply of said auxiliary supply reservoir pressure to said actuating cylinder.

16. A disc brake as recited in claim 15, wherein said filling piece is ring-shaped, being disposed in an annular cavity formed between said brake cylinder device and said auxiliary piston and having an inclined frontal surface contiguous with the adjacent surface of said auxiliary piston, said adjacent surface of said auxiliary piston being also inclined so that rotation of said filling piece relative to said auxiliary piston effects adjustment of said filling piece in a direction and amount corresponding to the axial displacement of said auxiliary piston relative to said brake cylinder device.

* * * * *